United States Patent [19]

Chen et al.

[11] Patent Number: 5,659,700

[45] Date of Patent: Aug. 19, 1997

[54] APPARATUS AND METHOD FOR GENERATING A MODULO ADDRESS

[75] Inventors: Hwang-Chung Chen; Shih-Chang Hsu, both of Taipei, Taiwan

[73] Assignee: Winbond Electronis Corporation, Hsinchu, Taiwan

[21] Appl. No.: 388,567

[22] Filed: Feb. 14, 1995

[51] Int. Cl.$^6$ ............................. G06F 12/00; G06F 12/02; G06F 9/26; G06F 9/34

[52] U.S. Cl. ..................... 395/421.07; 395/421.03; 395/421.04; 395/421.1; 395/421.11

[58] Field of Search ..................... 364/900, 200; 395/410, 421.07, 421.03, 421.04, 421.1 D, 421.11

[56] References Cited

U.S. PATENT DOCUMENTS

| | | | |
|---|---|---|---|
| 4,202,035 | 5/1980 | Lane | 364/200 |
| 4,800,524 | 1/1989 | Roesgen | 364/900 |

FOREIGN PATENT DOCUMENTS

WO92/08186  5/1992  WIPO .................. G06F 5/06

Primary Examiner—David K. Moore
Assistant Examiner—Than U. Nguyen
Attorney, Agent, or Firm—Graham & James LLP

[57] ABSTRACT

A method and apparatus for generating a modulo address for accessing a circular buffer. The method and apparatus accept as inputs a length L of the circular buffer, a current address A of the circular buffer, and an offset M between the current address and the next address to be generated. The offset M may be positive or negative. During operation of the present invention, the current address A first is broken down into a base address B and an offset from the base address a. Then, in accordance with the length L and the offset M, the invention determines an absolute offset and a wrapped offset. One of these offsets is added to the base address B to generate a next address for the circular buffer. The determination of which offset to add to the base address B is made by performing one of two comparisons. Specifically, either the absolute offset is compared to a predetermined value indicating the beginning of the circular buffer or the absolute offset is compared to a predetermined value indicating the end of the circular buffer, depending on a sign of the offset M. In a second embodiment of the invention, one of the offsets is added to the base address B in accordance with a Wrap flag determined by the circuit.

3 Claims, 3 Drawing Sheets

APPARATUS AND METHOD FOR GENERATING A MODULO ADDRESS

BACKGROUND OF THE INVENTION

1. Field of the Invention

This invention relates to an apparatus and method for generating a modulo address and, more particularly, to an apparatus and method for generating a modulo address used to access a circular buffer.

2. Related Art

The general concept of using modulo address generation to address a circular buffer is well-known. Commonly, a circular buffer has a predetermined length L. In a conventional circular buffer, a next address for accessing the circular buffer is generated by adding an offset M to a current address A. As successive offsets M are added, a resulting address will eventually exceed the address of the highest location in the circular buffer. When this occurs, modulo addressing causes the resulting address to automatically "wrap" back to the beginning of the circular buffer. In a similar manner, if the offset M is negative, a resulting address will eventually be less than the address of a lowest location of the circular buffer. In this case, modulo addressing will cause the address to "wrap" to the end of the buffer.

Modulo address generation is often implemented using software. Software generation of addresses, however, is slow and does not work well for certain types of applications, such as digital signal processing, which requires fast address generation. Modulo address generation also has been implemented in hardware circuitry.

SUMMARY OF THE INVENTION

The present invention provides a method and apparatus for generating a modulo address for accessing a circular buffer. The method and apparatus accepts as inputs a length L of the buffer, a current address A of the buffer, and an offset M, which is an offset between the current address, and a next address to be generated. The offset M may be positive or negative. Because the buffer is addressed in a circular manner, the next address will "wrap" to the beginning of the buffer if the address Would otherwise be past the end of the buffer and will "wrap" to the end of the buffer if the address would otherwise be past the beginning of the buffer.

During operation of the present invention, the current address A is broken down into a base address B and an offset from the base address a. Then, in accordance with the length L and the offset M, the invention determines an absolute offset, which does not take account of the circular nature of the buffer and may fall outside the boundary of the buffer, and a wrapped offset. One of these offsets is added to the base address B to generate a next address for the circular buffer. The determination of which offset to add to the base address B is made by performing one of two comparisons. Which comparison to perform is decided on the basis of the sign of the offset M. Specifically, either the absolute offset is compared to a predetermined value indicating the beginning of the circular buffer or the absolute offset is compared to a predetermined value indicating the end of the circular buffer. As discussed above, the implementation of modulo address generation in hardware circuitry used in the present invention is advantageous for applications requiring fast modulo address generation, such a digital signal processing applications.

The present invention is an apparatus for generating a modulo address for a circular buffer, comprising: circuitry for storing a length L of the circular buffer; circuitry for storing a current address A of the circular buffer; circuitry for storing an offset M between the current address A and a next address to be generated; circuitry for breaking down the current address A into a base address B and an offset from the base address a; circuitry for, in accordance with the length L and the offset M, determining an absolute offset; circuitry for, in accordance with the length L and the offset M, determining a wrapped offset; first comparison circuitry, operating when the offset M is negative, for determining whether the absolute offset will yield an address within the circular buffer; second comparison circuitry, operating when the offset M is positive, for determining whether the absolute offset will yield an address outside of the circular buffer; and adding circuitry, operating in accordance with one of the first and second comparison circuitry, for adding the base address B to one of the absolute offset and the wrapped offset to generate the next address for accessing the circular buffer.

In a second embodiment of the present invention, the offset that is to be added to the base address is determined by looking at carry_out bits from respective adders that generate the absolute offset and the wrapped offset. One of the carry_out bits is used to form a Wrap signal, which is used to select between the absolute offset and the wrapped offset. The selected offset is added to the base address B to generate a next address for the circular buffer.

The present invention is an apparatus for generating a next address for accessing a circular buffer, comprising: circuitry for storing a length L of the circular buffer; circuitry for storing a current address A of the circular buffer; circuitry for storing an offset M between the current address A and a next address to be generated; circuitry for breaking down the current address A into a base address B and an offset from the base address a; circuitry for, in accordance with the length L and the offset M, determining an absolute offset; circuitry for, in accordance with the length L and the offset M, determining a wrapped offset; circuitry for determining, when the offset M is negative, whether the absolute offset will yield an address outside of the circular buffer; second comparison circuitry for determining, when the offset M is positive, whether the wrapped offset will yield an address outside of the circular buffer; and adding circuitry, operating in accordance with one of the first and second comparison circuitry, for adding the base address B to one of the absolute offset and the wrapped offset to generate the next address for accessing the circular buffer.

Advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description includes a best presently contemplated mode of carrying out the invention. This description is made for the purpose of illustrating the general principles of the invention and is not to be taken in a limiting sense.

Figure 1:
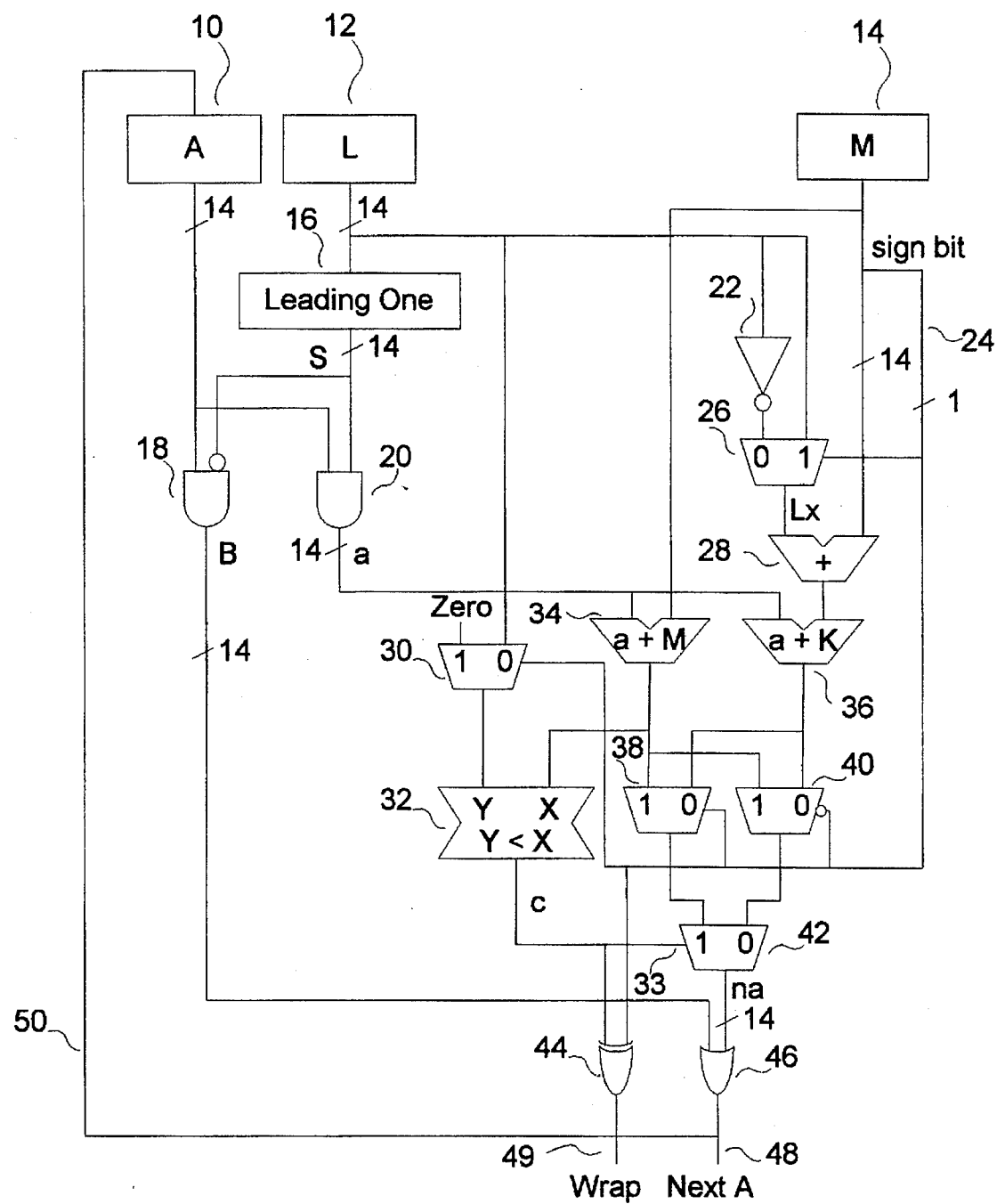
FIG. 1 is a logic diagram of a first embodiment of a circuit in accordance with the present invention.

FIG. 1 shows a circuit 100 comprising registers 10, 12, and 14; a leading one element 16; AND gates 18 and 20; an invertor 22; a selector 26; an adder 28; a selector 30; a comparator 32; adders 34 and 36; selectors 38, 40, and 42; an exclusive OR gate 44; and an OR gate 46. Register 10 stores a value A, which represents a current address of a circular buffer. Register 12 stores a value L, which represents a length of the circular buffer. Register 14 stores a value M, which represents an offset between the current address A and a next address to be accessed in the circular buffer. Offset M can be either positive or negative. The values A, L, and M are discussed below in connection with FIG. 3.

Figure 3:
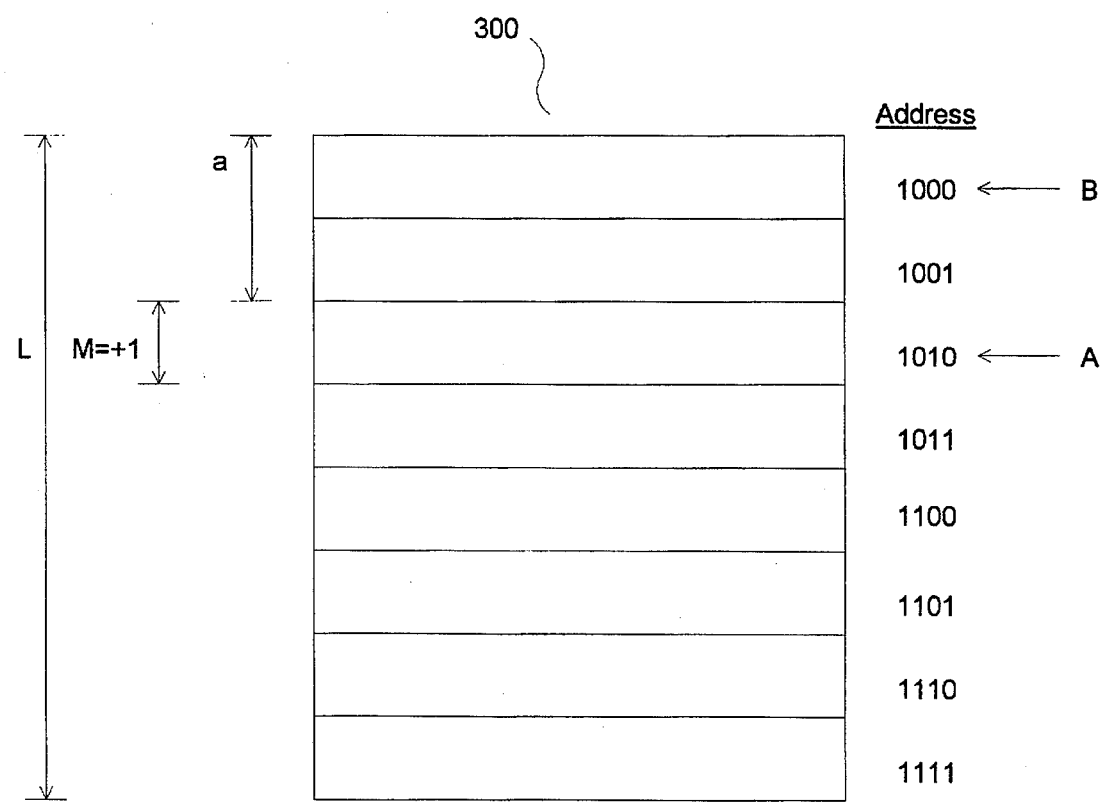
FIG. 3 is a diagram of a circular buffer accessed by modulo address generation.

FIG. 3 shows an exemplary circular buffer 300 at a base address B having a length L. For a given circular buffer, the base address B will always be the same. The base address B, the length L, and the current address A have the following properties:

i) $2^{(n-1)} < L <= 2^n$, where n is an integer
 ii) $B = m \times 2^n$, where m and n are integers
 iii) $B <= A < (B+L)$ The following discussion gives examples of generating addresses used to access the circular buffer. In the following examples, all addresses and lengths will be specified in binary notation. If, for example, the length L of the circular buffer is "1000" (i.e., 8), the current address A is "1010" and the offset M is +1, then the next address to be accessed in the circular buffer is A+M="1011" and no address wrapping has occurred. If, for example, the length L is "1000" (i.e., 8), the current address A is "1010" and the offset M is −1, then the next address to be accessed in the circular buffer is A+M= "1001" and no address wrapping has occurred.

Next assume that the length L is "1000" (i.e., 8), the current address A is "1010" and the offset M is +6. If 6 is added to the current address A, the resulting address will be outside the circular buffer, i.e., greater than the highest address ("1111") of the buffer. Therefore, it is necessary to "wrap" the generated address to the beginning of the circular buffer. In the current example, when wrapping occurs, the next address to be accessed in the circular buffer is A+M−L="1010"+6 −8="1000". Similarly, if the length L is "1000" (i.e., 8), the current address A is "1010" and the offset M is −6, then the next address to be accessed in the circular buffer is A+M+L="1010"+(−6)+8="1100" because the address has wrapped to the end of the circular buffer. If wrapping had not occurred, the next address would have been outside of the circular buffer, i.e., if wrapping had not occurred, the next address would have been smaller than the lowest address ("1000") of the circular buffer.

The following paragraphs describe the operation of circuit 100 of FIG. 1. Circuit 100 performs four main functions: 1) it breaks the current address A into components B and a; 2) it generates an absolute offset and a wrapped offset; 3) it adds one of the offsets to the base address B in accordance with one of two possible comparisons; and 4) it generates a "Wrap" flag.

Circuit 100 breaks the current address A down into a base address B and an offset "a" between the base address B and the current address A. In the described embodiment, B and a are each 14 bits wide. Other embodiments may use other widths.

The current address A is broken down as follows. Leading one element 16 outputs a mask S that has "1"s in its low bits and "0"s in its high bits. Specifically, the number of "1"s in the mask S is determined by the length L. In one implementation, leading one element 16 is a memory, such as a ROM, containing an index table that produces an output in accordance with an input value of L as shown below:

L=00 0000 0000 0000 then S=00 0000 0000 0000
L=00 0000 0000 0001 then S=00 0000 0000 0001
L=00 0000 0000 0010 then S=00 0000 0000 0001
L=00 0000 0000 0011 then S=00 0000 0000 0011
L=00 0000 0000 0100 then S=00 0000 0000 0011
L=00 0000 0000 01?? then S=00 0000 0000 0111
L=00 0000 0000 1000 then S=00 0000 0000 0111
L=00 0000 0000 1??? then S=00 0000 0000 1111
L=00 0000 0001 0000 then S=00 0000 0000 1111
L=00 0000 0001 ???? then S=00 0000 0001 1111
L=00 0000 0010 0000 then S=00 0000 0001 1111
L=00 0000 001? ???? then S=00 0000 0011 1111
L=10 0000 0000 0000 then S=01 1111 1111 1111
L=1? ???? ???? ???? then S=11 1111 1111 1111

(Note that, in this implementation, bits indicated by question marks ("?") cannot all be "0"s at the same time.)

For example, if L="1001" binary (i.e., 9), the mask S output from leading ones element 16 is "00000000001111". Similarly, if L="10000" binary (i.e., 16), the mask S is also "00000000001111". The mask S and the current address A are input to AND gate 20, which outputs offset a. Offset a is formed of the lowest n−1 bits of current address A, where $2^{n-1} < L <= 2^n$. Current address A and the negated value of the mask S are input to AND gate 18, which outputs base address B. Base address B always has "0"s in its lowest n−1 bits.

The present invention generates an absolute offset (a+M) and a wrapped offset (a+M+−L). Adder 34 generates the absolute offset (a+M). The wrapped offset is generated as follows. Selector 26 has a first input of the negation of L from invertor 22 and a second input of L. Selector 26 selects either its first or second input, respectively, in accordance with a sign bit of offset M on signal 24. In the described embodiment, M is stored using two's complement notation. M, however, could be stored using any appropriate notation. In the described embodiment, if M is negative, signal 24 is "1" and if M is positive, signal 24 is "0". Thus, selector 26 outputs "negative L" when M is positive (when signal 24 is "0") and outputs "positive L" when M is negative (when signal 24 is "1").

Adder 28 has as a first input the output of selector 26 (either positive L or negative L) and has as a second input the offset M. Thus, the output K of adder 28 is M−L when M is positive and M+L when M is negative. Adder 36 has as a first input the offset a and has as a second input the output K of adder 28. Thus, adder 36 outputs the wrapped offset, which is (a+M−L) when M is positive and which is (a+M+L) when M is negative.

The current invention includes comparison circuitry, which operates as follows. Selector 30 outputs either "0" (when M is negative) or the length L (when M is positive). Comparator 32 compares a first and a second input and outputs a "1" (TRUE) when the first input is less than the second input. Because the comparison performed by comparator 32 depends on an input determined by the sign of M, the comparison performed by comparator 32 is also determined by the sign of M.

Specifically, when M is negative, comparator 32 compares "0" and (a+M). Thus, when M is negative and 0<(a+M) comparator 32 outputs "1". This is equivalent to outputting "1" when (a+M) is an absolute offset yielding an address within the boundaries of the circular buffer. When M is positive, comparator 32 compares L and (a+M). Thus, when M is positive and L<(a+M) comparator 32 outputs "1". This is the same as outputting "1" when (a+M) is an absolute offset yielding an address outside the boundaries of the circular buffer.

Selectors 38, 40, and 42 operate to determine an offset na in accordance with the output c of comparator 32 and in accordance with the sign of M. Offset na is one of the absolute offset or the wrapped offset. The output c of comparator 32 is input as a select signal 33 to selector 42, which outputs the offset na. Signal 24, representing the sign of M, is input to selector 38. The negation of signal 24 is input to selector 40. Operation of selectors 38, 40, and 42 is summarized in the following table.

| sign of M (negative = 1) (positive = 0) | comparison used | output c | offset na |
|---|---|---|---|
| 1 | 0 < (a + M) | 1 (TRUE) | a + M |
| 1 | 0 < (a + M) | 0 (FALSE) | a + M + L |
| 0 | L < (a + M) | 0 (FALSE) | a + M |
| 0 | L < (a + M) | 1 (TRUE) | a + M − L |

As can be seen from the table, the output c does not indicate whether or not the absolute offset will yield an address that is within the circular buffer. Similarly, the output c does not indicate directly whether or not the absolute offset or the wrapped offset should be used as offset ha. Output c is interpreted in accordance with the sign of the offset M that is input to selectors 38 and 40 on signal 24. OR gate 46 adds the base address B and the offset na to output a next address for accessing the circular buffer. The next address is output on signal 48 and is stored in the A register 10 via signal 50 to become the new current address A.

Exclusive OR gate 44 has as a first input the output c of comparator 32 and has as a second input signal 24, which represents the sign of the offset M. The output of exclusive OR gate 44 indicates whether wrapping occurred during generation of the next address. Thus, if wrapping occurred, gate 44 outputs "1" on signal 49 and, if not, gate 44 outputs "0" on signal 49. Thus, gate 44 serves as a flag indicating whether wrapping occurred and may be used as such by other circuitry not shown in FIG. 1.

In the described embodiment, registers 12 and 14 receive their input values from sources outside the circuit shown in a manner known to persons of ordinary skill in the art. Similarly, register 10 receives an initial value from outside the circuit shown in a manner known to persons of ordinary skill in the art.

The present invention may also be implemented in software, firmware, or the like. In one embodiment, the software is stored in a ROM or a RAM and is executed by a CPU of a general purpose computer or by a CPU of a specialized computer. The operation of the invention in such an embodiment is described by the following pseudocode:

```
Break A into B and a
if M < 0
then
    if (a + M >= 0)
    then
        na = a + M
    else
        na = a + M + L
```

```
else
    if (a + M >= L)
    then
        na = a + M − L
    else
        na = a + M
Next_A = na + B
Wrap = sign_bit xor c
```

As will be obvious to persons of ordinary skill in the art, the above pseudocode parallels the operation of the circuit of FIG. 1.

Figure 2:
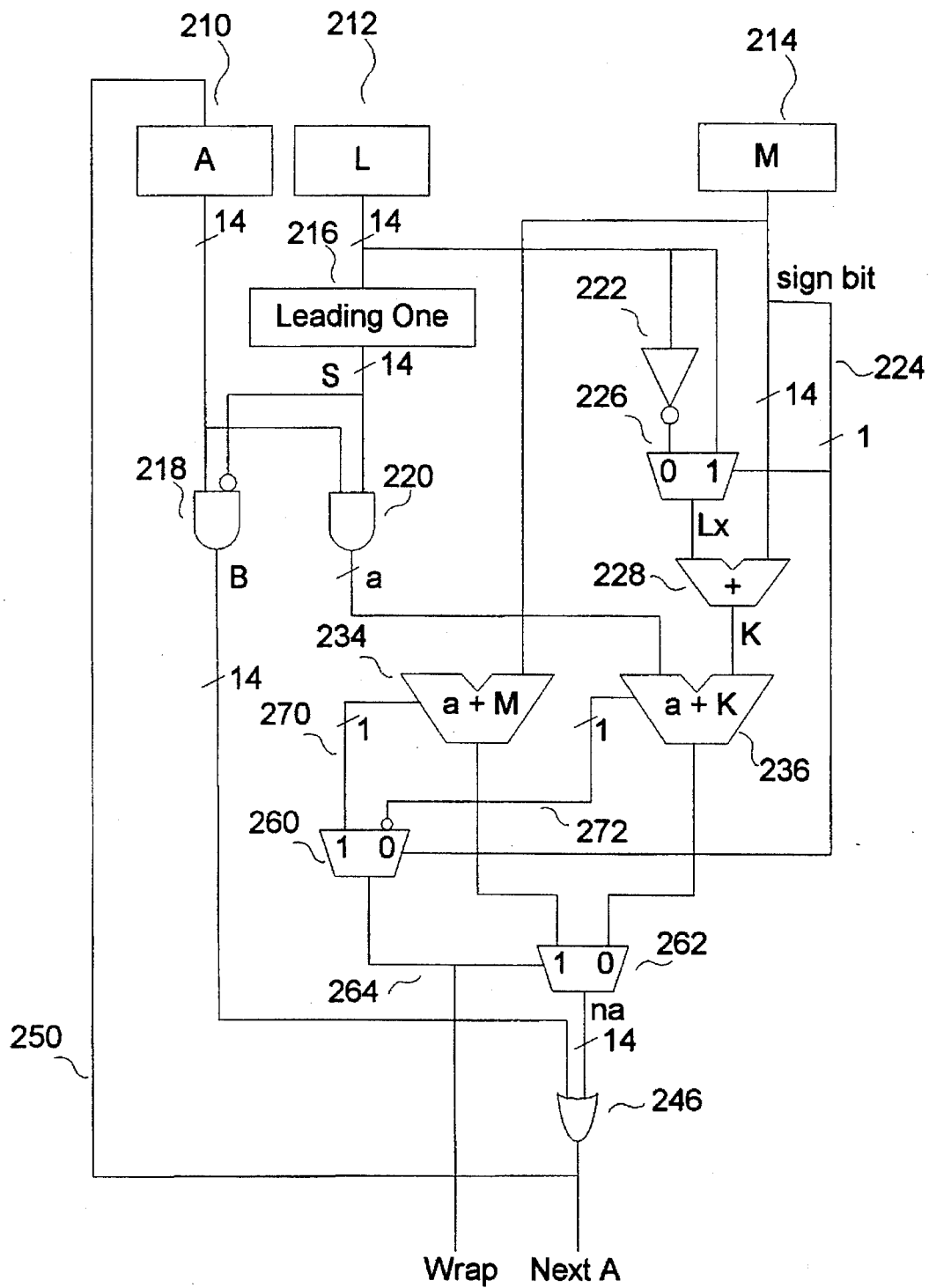
FIG. 2 is a logic diagram of a second embodiment of a circuit in accordance with the present invention.

FIG. 2 shows a circuit 200 comprising registers 210, 212, and 214; a leading one element 216; AND gates 218 and 220; an invertor 222; a selector 226; an adder 228; adders 234 and 236; selectors 260 and 262; and an OR gate 246. Register 210 stores a value A, which represents a current address of a circular buffer. Register 212 stores a value L, which represents a length of the circular buffer. Register 214 stores a value M, which represents an offset between the current address A and a next address to be accessed in the circular buffer. Offset M can be either positive or negative. The values A, L, and M are discussed above in connection with FIG. 3.

The following paragraphs describe the operation of circuit 200. Circuit 200 performs four main functions: 1) it breaks the current address A into components B and a; 2) it generates an absolute offset and a wrapped offset; 3) it generates a "Wrap" flag and 4) it adds one of the offsets to the base address B in accordance with the Wrap flag. Some elements of the circuit of FIG. 2 operate in the same manner as corresponding elements of FIG. 1. The operation of the elements that break the current address A into components and that generate an absolute offset and a wrapped offset have been discussed previously in connection with FIG. 1 and will not be discussed in connection with FIG. 2.

The second embodiment of the present invention includes circuitry for generating a Wrap flag 264. When offset M is negative then, if wrapping should occur, the value of a carry_out bit 270 of adder 234 (a+M) is equal to "1" because an underflow has occurred in adder 234. If no wrapping should occur, calculation of an absolute offset (a+M) in adder 234 does not cause an underflow and carry_out bit 270 has a value of "0". When offset M is positive then, if wrapping should occur, a carry_out bit 272 of adder 236 (a+M+−L) has a value of "0" because no underflow has occurred in adder 236. If no wrapping should occur, calculation of a wrapped offset in adder 236 causes an underflow and bit 272 has a value of "1".) Carry_out bit signal 272 is negated before it is input to selector 260.

When M is positive, sign of M signal 224 has a value of "0". When M is negative, sign of M signal 224 has a value of "1". Depending on whether M is positive or negative, selector 260 selects one of carry_out bit 270 and negated carry_out bit 272 to become Wrap flag 264. Thus, Wrap flag 264 that is output from selector 260 indicates whether the wrapped offset or the absolute offset should be used. Selector 262 selects either the absolute offset from, adder 234 or the wrapped offset from adder 236 in accordance with the Wrap flag 264 and outputs the selected offset to OR gate 246 to be added to the base address B.

The present invention may also be implemented in software, firmware, or the like. In one embodiment, the software is stored in a ROM or a RAM and is executed by a CPU of a general purpose computer or by a CPU of a specialized computer. The operation of the invention in such an embodiment is described by the following pseudocode:

```
Break A into B and a
if M < 0
    then
            if (a = M < 0)
            then
                wrap = 1
                na = a + M + L
            else
                wrap = 0
                na = a + M
    else
            if (a + M − L < 0)
            then
                wrap = 0
                na = a + M
            else
                wrap = 1
                na = a + M − L
Next_A = na + B
```

As will be obvious to persons of ordinary skill in the art, the above pseudocode parallels the operation of the circuit of FIG. 2.

It will be understood that various modification may be made to the present invention without departing from the spirit and scope of the invention. In describing a preferred embodiment, a number of specific technologies used to implement the embodiment of various aspects of the invention were identified and related to more general terms in which the invention was described. However, it should be understood that such specificity is not intended to limit the scope of the claimed invention.

What is claimed is:

1. An apparatus for generating a next address for accessing a circular buffer, comprising:

circuitry for storing a length L of the circular buffer;

circuitry for storing a current address A of the circular buffer;

circuitry for storing an offset M between the current address A and a next address to be generated;

circuitry for breaking down the current address A into a base address B and an offset from the base address a, wherein the circuitry for breaking down the current address A includes a leading one element, having L as an input, for outputting a mask S having "1"s in its low n−1 bits where $2^{n-1} < L <= 2^n$;

circuitry for, in accordance with the length L and the offset M, determining an absolute offset;

circuitry for, in accordance with the length L and the offset M, determining a wrapped offset;

first comparison circuitry, operating when the offset M is negative, for determining whether the absolute offset will yield an address within the circular buffer;

second comparison circuitry, operating when the offset M is positive, for determining whether the absolute offset will yield an address outside of the circular buffer; and adding circuitry, operating in accordance with one of the first and second comparison circuitry, for adding the base address B to one of the absolute offset and the wrapped offset to generate the next address for accessing the circular buffer.

2. The apparatus of claim 1, wherein the circuitry for breaking down the current address A further includes a logic gate coupled to the circuitry for storing the current address A and to the leading one element, outputting the offset a.

3. The apparatus of claim 1, wherein the circuitry for breaking down the current address A further includes a logic gate coupled to the circuitry for storing the current address A and to the leading one element, outputting the base address B.

* * * * *